US012447796B2

(12) United States Patent
Son et al.

(10) Patent No.: US 12,447,796 B2
(45) Date of Patent: Oct. 21, 2025

(54) HEADLINER AIR VENT DEVICE FOR A VEHICLE

(71) Applicants: HYUNDAI MOTOR COMPANY, Seoul (KR); KIA CORPORATION, Seoul (KR); ITW EF&C KOREA LLC., Incheon (KR)

(72) Inventors: Bong Kyung Son, Ulsan (KR); Dong Won Yeon, Hwaseong-si (KR); Myung Hun Kang, Gwangmyeong-si (KR); Yong Seok Park, Seoul (KR); Keong No Kim, Incheon (KR); Chun Ha Kim, Seoul (KR)

(73) Assignees: HYUNDAI MOTOR COMPANY, Seoul (KR); KIA CORPORATION, Seoul (KR); ITW EF&C KOREA LLC., Incheon (KR)

( * ) Notice: Subject to any disclaimer, the term of this patent is extended or adjusted under 35 U.S.C. 154(b) by 427 days.

(21) Appl. No.: 18/078,754

(22) Filed: Dec. 9, 2022

(65) Prior Publication Data
US 2023/0398833 A1 Dec. 14, 2023

(30) Foreign Application Priority Data
Jun. 9, 2022 (KR) .................. 10-2022-0070029

(51) Int. Cl.
*B60H 1/00* (2006.01)
(52) U.S. Cl.
CPC ................. *B60H 1/00685* (2013.01)

(58) Field of Classification Search
CPC .. B60H 1/00685; B60H 1/345; B60H 1/3471; B60H 1/3414; B64D 2013/003
See application file for complete search history.

(56) References Cited

U.S. PATENT DOCUMENTS

| 11,305,617 | B2 | 4/2022 | Youn et al. | |
|---|---|---|---|---|
| 2002/0119745 | A1* | 8/2002 | Thomassin | F24F 13/065 454/76 |
| 2020/0156446 | A1 | 5/2020 | Youn et al. | |
| 2020/0338964 | A1* | 10/2020 | Lee | B60H 1/3414 |
| 2021/0031594 | A1* | 2/2021 | Schaal | B60H 1/345 |
| 2023/0278402 | A1* | 9/2023 | Lim | B60H 1/3428 454/155 |

FOREIGN PATENT DOCUMENTS

| KR | 20200058697 A | 5/2020 | |
|---|---|---|---|
| KR | 20210059458 A | 5/2021 | |
| WO | WO-2021096045 A1 * | 5/2021 | ............. B60H 1/245 |

* cited by examiner

*Primary Examiner* — Ko-Wei Lin
(74) *Attorney, Agent, or Firm* — Lempia Summerfield Katz LLC (57) ABSTRACT

Proposed is a headliner air vent device for a vehicle. A housing includes a first outlet through which air is discharged and a second outlet comparted by an inner cover and having a configuration by which air is discharged through outside the first outlet. An air guide supporter is rotatable inside the housing. An air guide is positioned to face an outer cover by which the second outlet is defined. The air guide is configured to move upwards or downwards in response to rotation of the air guide supporter to selectively open or close the second outlet.

9 Claims, 7 Drawing Sheets

HEADLINER AIR VENT DEVICE FOR A VEHICLE

CROSS-REFERENCE TO RELATED APPLICATION

This application claims under 35 U.S.C. § 119(a) the benefit of priority to Korean Patent Application No. 10-2022-0070029 filed on Jun. 9, 2022, the entire contents of which are incorporated herein by reference.

BACKGROUND

(a) Technical Field

The present disclosure relates to a headliner air vent device for a vehicle, and more specifically, to a headliner air vent device for a vehicle, the headliner air vent device allowing a user who has entered a vehicle to select directly blown air or dispersed blown air as the direction of blown air with a simple operation.

(b) Background Art

In general, the dashboard of a vehicle is provided with an air vent for blowing cold or warm air into the interior of the vehicle. Recently, a variety of air vent technologies applied to not only the dashboard but also the headliner of the roof of a vehicle have been disclosed.

Typically, an air vent for a vehicle includes a duct guiding the flow of air into the interior of the vehicle, a plurality of inner wings rotating to guide the direction of blown air to the right or left, a plurality of outer wings rotating to guide the direction of blown air upward or downward, and a knob allowing the inner wings and the outer wings to rotate.

In this example, the inner wings are configured to rotate in the horizontal direction about hinges provided on the upper and lower sides thereof, and are also referred to as vertical wings. The outer wings are configured to rotate in the vertical direction about hinges provided on the right and left sides thereof, and are also referred to as horizontal wings.

However, the typical air vent described above has a narrow blowing range, since air is indirectly blown toward a central blowing outlet. Thus, there may be a problem in that a user in direct contact with directly blown air feels cold or the like instead of feeling refreshed.

In order to overcome this problem, air vent technology for indirectly blowing and dispersing blown air by providing holes around the central blowing outlet has been actively developed. Furthermore, a headliner air vent disposed above the head of a user and configured to blow air has attracted attention.

Such dispersed blowing outlet technology may advantageously realize a more pleasant indoor space by more widely dispersing directly blown air.

However, according to the currently disclosed headliner air vent technology, knob members are directly provided adjacent to dispersed blowing outlets, respectively, for independent opening/closing operations of the dispersed blowing outlets, and thus a separate intermediate cover member for the installation of the knob members is required. Accordingly, there may be problems such as low productivity of products and frequent malfunctioning during operations.

In addition, a simple provision of the dispersed blowing outlets on the outer peripheral portion of the central blowing outlet provides no significant dispersed blowing effect of air, due to the air blown in a straight direction.

The above information disclosed in this Background section is only for enhancement of understanding of the background of the disclosure and accordingly it may include information that does not form the prior art that is already known to a person of ordinary skill in the art.

SUMMARY OF THE DISCLOSURE

The present disclosure has been made in an effort to solve the above-described problem associated with the related art. An object of the present disclosure is to provide a headliner air vent device for a vehicle, wherein, in an opened state of an outlet through which air is discharged indirectly to the interior of a vehicle, i.e., in an on state of a diffusion function, an air guide may be selectively moved upwards or downwards to control conversion to a closed state of the outlet, i.e., an off state of the diffusion function, by the application of a structure for converting rotation into linear movement in response to rotation of a rotator. Consequently, the configuration of a manipulation knob exposed externally may be omitted, thereby providing a superior appearance and improving the productivity of products.

The object of the present disclosure is not limited to the aforementioned object, and the other objects not mentioned may be clearly understood by those with ordinary skill in the art to which the present disclosure pertains (hereinafter 'those having ordinary skill in the art') from the following description.

The features of the present disclosure for achieving the object of the present disclosure, and performing the characteristic functions of the present disclosure to be described below, are as follows.

A headliner air vent device for a vehicle according to the present disclosure may include: a housing including a first outlet through which air is discharged and a second outlet comparted by an inner cover and having a configuration by which air is discharged through outside the first outlet; an air guide supporter configured to be rotatable inside the housing; and an air guide positioned to face an outer cover by which the second outlet is defined, the air guide being configured to move upwards or downwards in response to rotation of the air guide supporter to selectively open or close the second outlet.

The air guide supporter may include: a rotatable body disposed to surround the inner cover and coupled to a rear cover configured such that that the second outlet is divided into a plurality of sections; and a plurality of lift guide recesses provided on an outer circumferential surface of the body, each of the plurality of lift guide recesses being configured to extend in a shape of a spiral from an opened mouth.

The air guide may include: a ring-shaped main body disposed to surround the outer circumferential surface of the body; a plurality of rib members perpendicularly protruding from the main body, inserted into guide holes provided in the rear cover, and configured to fix a position of rotation of the main body; and guide protrusions protruding from an inner circumferential surface of the main body, disposed on the mouth, and configured to be selectively inserted into the lift guide recesses in response to rotation of the body.

The guide protrusions may conform to the lift guide recesses.

The rib members may have a predetermined length such that the rib members inserted into the guide holes guide upward or downward movement of the main body as the guide protrusions are moved to ends of the lift guide recesses.

An outer circumferential surface of the main body facing the outer cover may be inclined at an angle matching an angle of the outer cover.

The headliner air vent device may further include a rotator coupled to the air guide supporter and configured to rotate the air guide supporter outside the housing.

The rotator may include a plurality of protrusions protruding from one surface thereof exposed to the outside of the housing.

The headliner air vent device may further include a vane coupled to the housing and configured to open and close the first outlet.

The vane may include: a plurality of vane members divided from each other, conforming to the shape of the first outlet, and coupled to a plurality of hinge shafts provided on the inner cover, respectively, to be rotatable; and a link member connecting the plurality of vane members to each other so that the plurality of vane members simultaneously pivot about the plurality of hinge shafts.

According to the present disclosure, in the opened state of the outlet through which air is discharged indirectly to the interior of the vehicle, i.e., in the on state of the diffusion function, the air guide may be selectively moved upwards or downwards to control conversion to the closed state of the outlet, i.e., the off state of the diffusion function, by the application of the structure for converting rotation into linear movement in response to rotation of the rotator. Consequently, the configuration of the manipulation knob exposed externally may be omitted, thereby providing a superior appearance and improving the productivity of products.

In addition, according to the present disclosure, the structure of the rear cover may be modified so that the area of the outlet is increased compared to that of the related art in the on state of the diffusion function, thereby achieving an effect of increasing the efficiency of dispersed blowing of air.

The effect of the present disclosure is not limited to the aforementioned effect, and the other effects not mentioned may be clearly recognized by those having ordinary skill in the art from the following description.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The above and other features of the disclosure are discussed below.

BRIEF DESCRIPTION OF THE DRAWINGS

The above and other features of the present disclosure are described below in detail with reference to certain examples thereof illustrated in the accompanying drawings which are given herein below by way of illustration only, and thus are not limitative of the present disclosure, and wherein.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes may be determined in section by the particular intended application and use environment.

In the figures, reference numbers refer to the same or equivalent sections of the present disclosure throughout the several figures of the drawings.

DETAILED DESCRIPTION

Hereinafter, the present disclosure is described in detail with reference to the accompanying drawings.

The advantages and features of the present disclosure, as well as methods of realizing the same, should be more clearly understood with reference to the following detailed description of embodiments in conjunction with the accompanying drawings.

However, the present disclosure is not limited by embodiments to be disclosed hereinafter, but may be embodied in a variety of different forms. Rather, these embodiments are provided to make the description of the present disclosure complete and to fully convey the scope of the present disclosure to those having ordinary skill in the technical field to which the present disclosure pertains. The present disclosure shall be defined by the scope of the Claims.

Further, in the following description of the present disclosure, a detailed description of known technology or the like has been omitted when it is determined that the detailed description thereof may obscure the subject matter of the present disclosure.

Figure 1:
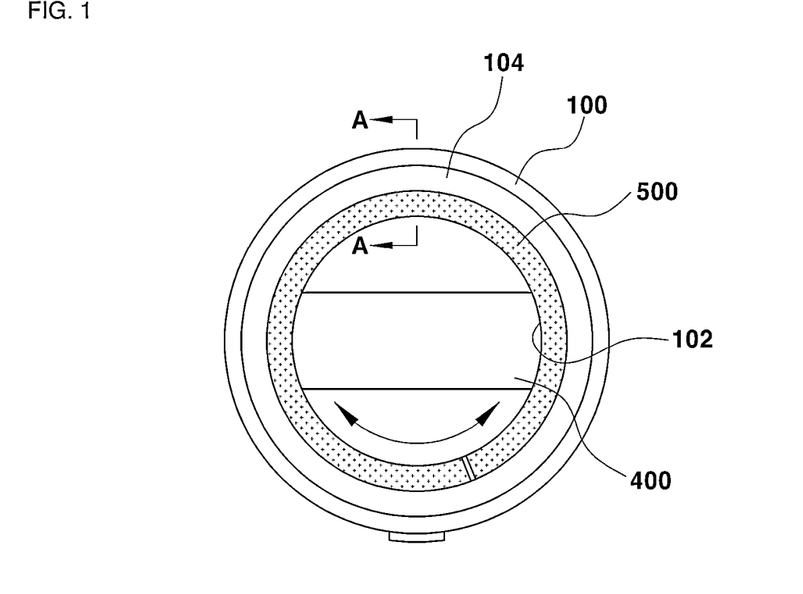
FIG. 1 is a view illustrating a diffusion-on state of a headliner air vent device for a vehicle according to an embodiment of the present disclosure.
Figure 2:
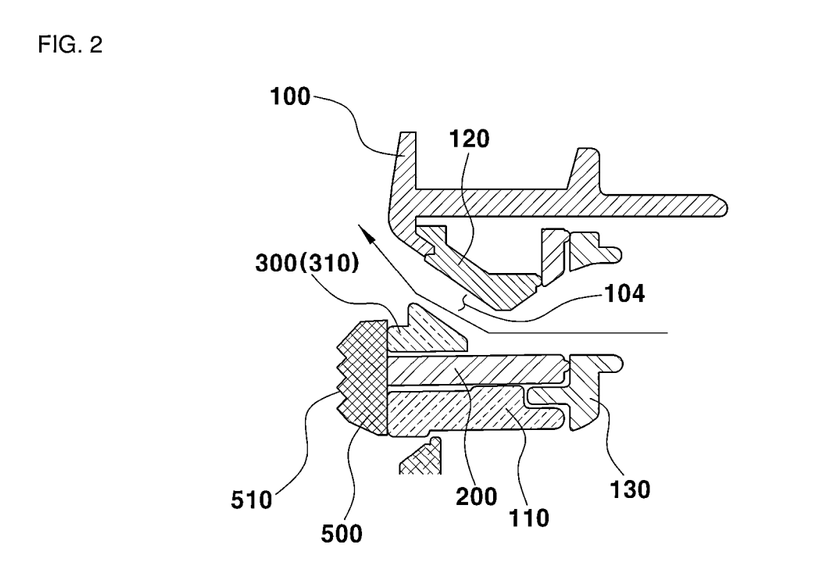
FIG. 2 is a cross-sectional view taken along line A-A in FIG. 1 to illustrate the structure of the headliner air vent device for a vehicle according to an embodiment of the present disclosure.

FIG. 1 is a view illustrating a diffusion-on state of a headliner air vent device for a vehicle according to an embodiment of the present disclosure. FIG. 2 is a cross-sectional view taken along line A-A in FIG. 1 to illustrate the structure of the headliner air vent device for a vehicle according to an embodiment of the present disclosure.

Figure 3:
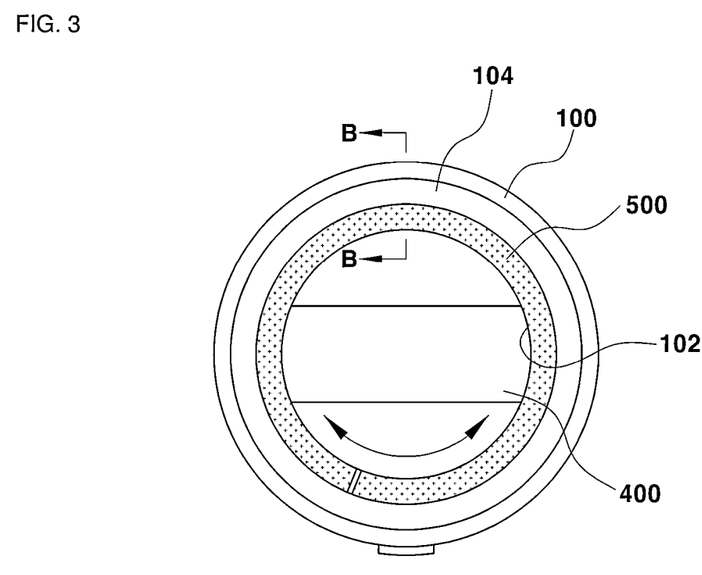
FIG. 3 is a view illustrating a diffusion-off state of the headliner air vent device for a vehicle according to an embodiment of the present disclosure.
Figure 4:
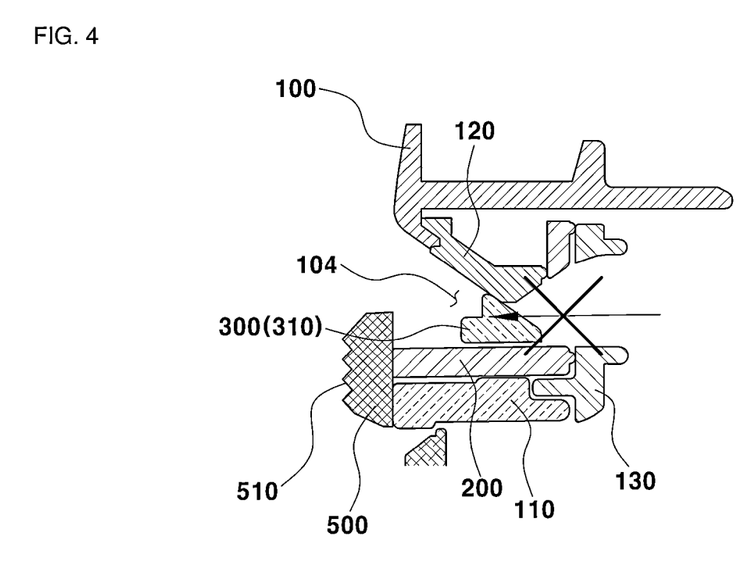
FIG. 4 is a cross-sectional view taken along line B-B in FIG. 3 to illustrate the structure of the headliner air vent device for a vehicle according to an embodiment of the present disclosure.

In addition, FIG. 3 is a view illustrating a diffusion-off state of the headliner air vent device for a vehicle according to an embodiment of the present disclosure, and FIG. 4 is a cross-sectional view taken along line B-B in FIG. 3 to illustrate the structure of the headliner air vent device for a vehicle according to an embodiment of the present disclosure.

Figure 5:
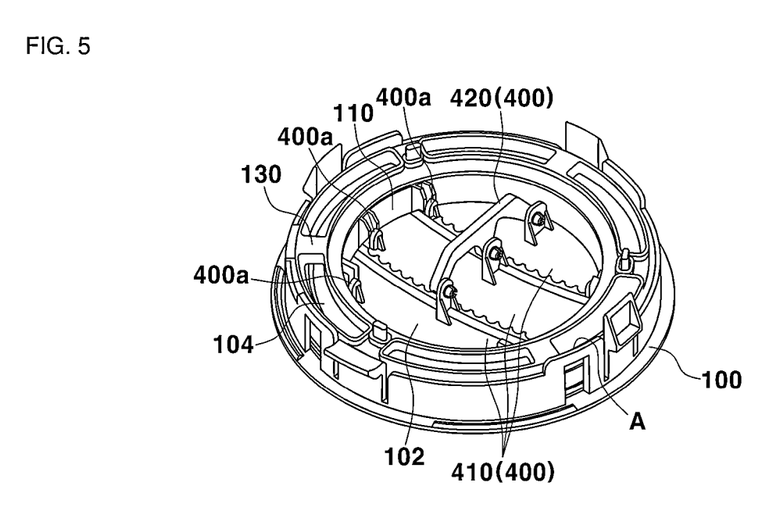
FIG. 5 is a view illustrating an internal configuration of the headliner air vent device for a vehicle according to an embodiment of the present disclosure.
Figure 6:
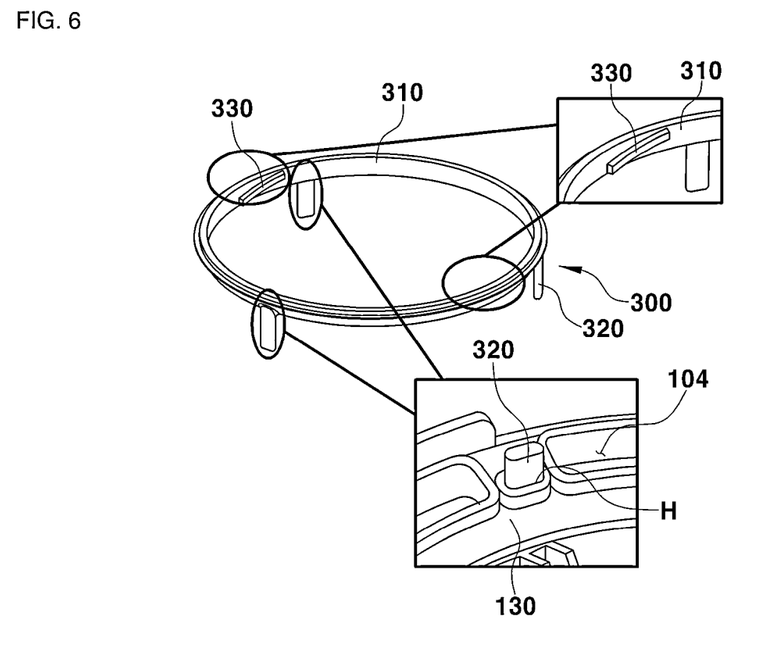
FIG. 6 is a view illustrating an air guide of the headliner air vent device for a vehicle according to an embodiment of the present disclosure.
Figure 7:
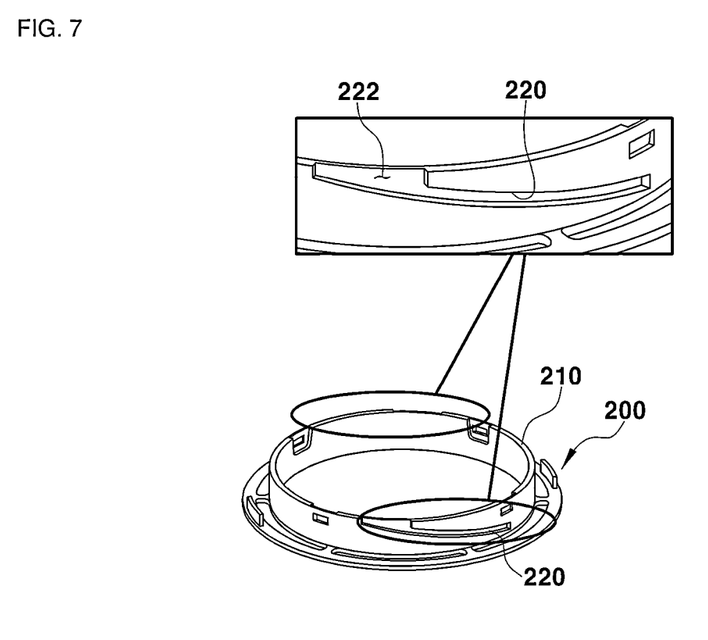
FIG. 7 is a view illustrating an air guide supporter of the headliner air vent device for a vehicle according to an embodiment of the present disclosure.

Furthermore, FIG. 5 is a view illustrating an internal configuration of the headliner air vent device for a vehicle according to an embodiment of the present disclosure, FIG. 6 is a view illustrating an air guide of the headliner air vent device for a vehicle according to an embodiment of the present disclosure, and FIG. 7 is a view illustrating an air guide supporter of the headliner air vent device for a vehicle according to an embodiment of the present disclosure.

In general, a plurality of headliner air vent devices for a vehicle are disposed in a plurality of positions on front and rear sides of the headliner to blow air to occupants in the second and third rows disposed in the interior of a vehicle. Such headliner air vent devices may provide the interior of the vehicle with warm air generated by a heater in a case in which the ambient temperature is low as in the winter and cold air in a case in which the ambient temperature is high as in the summer, so that occupants in the vehicle are in a pleasant condition without being influenced by the ambient temperature.

In a typical headliner air vent device for a vehicle, an occupant in the vehicle adjusts the amount and direction of blowing air supplied into the interior of the vehicle by adjusting the amount of opening of a vane.

However, such headliner air vent devices for a vehicle supply air directly toward the heads of occupants seated on seats, and thus have the problems in that occupants may complain of headache in the case of a long distance travel or feel unpleasant with their hair scattered by blown air. In addition, it may not be possible to use air that is supplied to the interior of the vehicle while being widely dispersed.

Therefore, it is necessary to indirectly supply air to occupants and widely disperse the supplied air in the interior of the vehicle. To this end, as illustrated in FIGS. 1-4, the headliner air vent device for a vehicle according to the present embodiment may include a housing 100, an air guide supporter 200, an air guide 300, and a vane 400.

The housing 100 includes a first outlet 102 provided as a main outlet through which air is discharged and a second outlet 104 comparted by an inner cover 110 to allow air to be discharged indirectly, i.e., discharged through the outside of the first outlet 102.

In a state in which the first outlet 102 is closed, the housing 100 may provide a diffusion function by which the second outlet 104 is independently opened.

This diffusion function of the housing 100 may be selectively performed by manipulating the air guide supporter 200.

In other words, the air guide supporter 200 is disposed inside the housing 100 to surround the inner cover 110, and is configured to be rotatable along the outer circumferential surface of the inner cover 110.

As illustrated in FIG. 7, the air guide supporter 200 includes a body 210 and lift guide recesses 220.

The body 210 is coupled to a rear cover 130 having a configuration by which the second outlet 104 is divided into a plurality of sections, and is configured to be rotatable in response to the rotation of a rotator 500.

In one example, the rear cover 130 may be divided into six (6) discharge areas A each of which is expanded and has a predetermined length to increase the dispersing area while reducing air flow resistance compared to that of the related art (see FIG. 5).

The rotator 500 is coupled to the body 210 and exposed to the outside of the housing 100. The rotator 500 serves to rotate the body 210 so that the second outlet 104 is opened, i.e., the diffusion function is converted to an on state as illustrated in FIG. 1.

The rotator 500 may have a plurality of protrusions 510 protruding from one surface thereof exposed to the outside of the housing 100, thereby allowing an occupant to effectively manipulate the rotator 500 to rotate.

The one surface of the rotator 500 including the protrusions 510 may be coated with elastic members or the like by which the occupant may reliably hold the rotator 500 when manipulating the rotator 500 to rotate.

In addition, the lift guide recesses 220 are disposed on the outer circumferential surface of the body 210 as a pair of lift guide recesses 220 facing away from each other. Each of the lift guide recesses 220 is formed to extend in the shape of a spiral from an opened mouth 222 (i.e., an opened mouth 222 portion of the lift guide recesses 220), as shown in FIG. 7.

Thus, in a state in which the air guide 300 is positioned on the mouths 222 of the lift guide recesses 220, i.e., in the on state of the diffusion function in which the second outlet 104 is opened as illustrated in FIGS. 1 and 2, when the body 210 is rotated by manipulating the rotator 500 to rotate, the air guide 300 may be selectively moved upwards by the lift guide recesses 220 to close the opened second outlet 104 as illustrated in FIGS. 3 and 4, thereby converting the diffusion function to an off state.

When the body 210 is rotated by manipulating the rotator 500 to rotate, the upward movement of the air guide 300 is not viewable from the outside of the rotator 500 because the rotator 500 and the air guide 300 are separated from each other. Thus, such a hidden pop-up structure is free from interior fitting regulations and may provide a simple design.

The air guide 300 is disposed to surround the air guide supporter 200, and is positioned to face an outer cover 120 by which the second outlet 104 is defined.

The air guide 300 described above is configured to be moved upwards in response to the rotation of the air guide supporter 200, thereby selectively opening and closing the second outlet 104.

The air guide 300 includes an inclined surface having a predetermined slope, and the outer cover 120 also includes an inclined surface matching the inclined surface of the air guide 300. Therefore, when opening the second outlet 104 to provide the diffusion function, air discharged through the second outlet 104 may collide with the air guide supporter 200 and be discharged while being dispersed toward the outside of the housing 100 at a wind angle of about 90° along the inclined surfaces facing away from each other, thereby increasing the dispersing area of the discharged air.

As illustrated in FIG. 6, the air guide 300 includes a main body 310, rib members 320, and guide protrusions 330.

The main body 310 is disposed to surround the outer circumferential surface of the body 210, and, in one example, formed in the shape of a ring like the body 210.

A plurality of rib members 320 perpendicularly protrude from the main body 310, and are inserted into guide holes H provided in the rear cover 130.

Thus, the rib members 320 may fix the position of rotation even in the rotation of the body 210, thereby preventing the rotation and converting the rotation of the body 210 into a linear movement caused by upward or downward movement. Consequently, when the main body 310 is moved upwards or downwards by the rotation of the body 210, a path on which the main body 310 is moved upwards or downwards may be guided through the three (3) rib members 320.

The rib members 320 are formed with a predetermined length and disposed to protrude from the guide holes H in order to guide the path on which the main body 310 is moved upwards or downwards (see the expanded part in FIG. 7).

A pair of guide protrusions 330 are provided to protrude from the inner circumferential surface of the main body 310, and are disposed to face the pair of lift guide recesses 220 formed on the outer circumferential surface of the body 210, respectively.

The shape of each of the guide protrusions 330 conforms to the spiral shape of each of the lift guide recesses 220. Thus, when the body 210 rotates, the guide protrusions 330 move from the mouths 222 to ends of the lift guide recesses 220, so that the main body 310 is moved upwards or downwards with respect to the rib members 320.

When the main body 310 is moved upwards or downwards as described above, the outer circumferential surface of the main body 310 is formed with the same inclined angle as the angle of the outer cover 120. Consequently, the outer circumferential surface of the main body 310 may be brought into tight contact with the outer cover 120, thereby closing the second outlet 104.

Based on the plurality of configurations described above, the conversion of the diffusion function from the on state to the off state is sequentially described as follows with reference to FIGS. 1-4.

When the rotator 500 is rotated, the body 210 to which the rotator 500 is coupled is rotated along the inner cover 110 in the same direction as the direction of rotation of the rotator 500.

As the body 210 rotates, the guide protrusions 330 are positioned inside the lift guide recesses 220. As the positions of the guide protrusions 330 are moved to ends of the lift guide recesses 220, the lift guide recesses 220 push the guide protrusions 330 upwards.

Consequently, as the main body 310 is moved upwards or downwards, the rib members 320 inserted into the guide holes H guide the path on which the main body 310 is moved upwards or downwards. As the outer circumferential surface of the main body 310 and the outer cover 120 are positioned to be in contact with each other, the second outlet 104 is closed, thereby preventing air from flowing through the second outlet 104. As a result, the diffusion function is converted from the on state to the off state.

In the related art, a separate configuration such as a manipulation knob (not shown) for opening and closing the second outlet 104 is required to perform the above-described on/off conversion of the diffusion function. In contrast, in the present embodiments, it is possible to selectively open and close the second outlet 104 by rotating the rotator 500 without the configuration of the manipulation knob (not shown). Accordingly, a better appearance may be provided, and the productivity of products may be improved by omitting a component.

The vane 400 is coupled to the housing 100 to be axially rotatable, and configured to open and close the first outlet 102 when operated.

In this regard, as illustrated in FIG. 5, the vane 400 includes a plurality of vane members 410 and a link member 420.

The vane members 410 are divided from each other, and conform to the shape of the first outlet 102. In one example, three (3) vane members 410 having different shapes are configured to cover the first outlet 102 having a circular shape.

In addition, the link member 420 serves to connect the vane members 410 to each other so that the three vane members 410 simultaneously pivot about hinge shafts 400a.

In this manner, when the vane members 410 are simultaneously pivoted about the hinge shafts 400a by the link member 420, air is discharged into the interior of the vehicle through the first outlet 102. The amount and direction of air discharged at this time may be adjusted differently depending on the degrees of pivoting of the vane members 410.

According to the present disclosure, in the opened state of the outlet through which air is discharged indirectly to the interior of the vehicle, i.e., in the on state of the diffusion function, the air guide may be selectively moved upwards or downwards to control conversion to the closed state of the outlet, i.e., the off state of the diffusion function, by the application of the structure for converting rotation into linear movement in response to rotation of the rotator. Consequently, the configuration of a manipulation knob protruding toward the outside may be omitted, which makes it possible to provide a superior appearance and improve the productivity of products.

In addition, according to the present disclosure, the structure of the rear cover may be modified so that the area of the outlet is increased compared to that of the related art in the on state of the diffusion function, thereby achieving an effect of increasing the efficiency of dispersed blowing of air.

Although some embodiments have been provided to illustrate the present disclosure in conjunction with the accompanying drawings, it should be apparent to those having ordinary skill in the art that the embodiments are provided for illustrative purposes only, and that various modifications and alterations can be made without departing from the spirit and scope of the present disclosure. It should also be understood that the entirety or some of the foregoing embodiments may be selectively combined. Accordingly, the true scope and spirit of the present disclosure shall be defined only by the appended claims.

What is claimed is:

1. A headliner air vent device for a vehicle, the headliner air vent device comprising:
    a housing comprising a first outlet through which air is discharged and a second outlet comparted by an inner cover and having a configuration by which air is discharged through outside the first outlet;
    an air guide supporter configured to be rotatable inside the housing; and
    an air guide positioned to face an outer cover by which the second outlet is defined, the air guide being configured to move upwards or downwards in response to rotation of the air guide supporter to selectively open or close the second outlet,
    wherein the air guide supporter comprises:
    a rotatable body disposed to surround the inner cover and coupled to a rear cover configured such that the second outlet is divided into a plurality of sections; and
    a plurality of lift guide recesses provided on an outer circumferential surface of the body, each of the plurality of lift guide recesses being configured to extend in a shape of a spiral from an opened mouth,
    and wherein the air guide comprises guide protrusions configured to be selectively inserted into the plurality of lift guide recesses in response to rotation of the body.

2. The headliner air vent device of claim 1, wherein the air guide further comprises:
    a ring-shaped main body disposed to surround the outer circumferential surface of the body; and a plurality of rib members perpendicularly protruding from the main body, inserted into guide holes provided in the rear cover, and configured to fix a position of rotation of the main body, wherein the the guide protrusions protrude from an inner circumferential surface of the main body, disposed on the open mouth.

3. The headliner air vent device of claim 2, wherein the guide protrusions conform to the plurality of lift guide recesses.

4. The headliner air vent device of claim 2, wherein the plurality of rib members have a predetermined length such that the rib members inserted into the guide holes guide upward or downward movement of the main body as the guide protrusions are moved to ends of the plurality of lift guide recesses.

5. The headliner air vent device of claim 2, wherein an outer circumferential surface of the main body facing the outer cover is inclined at an angle matching an angle of the outer cover.

6. The headliner air vent device of claim 1, further comprising a rotator coupled to the air guide supporter and configured to rotate the air guide supporter outside the housing.

7. The headliner air vent device of claim 6, wherein the rotator comprises a plurality of protrusions protruding from one surface thereof exposed to an outside of the housing.

8. The headliner air vent device of claim 1, further comprising a vane coupled to the housing and configured to open and close the first outlet.

9. The headliner air vent device of claim 8, wherein the vane comprises:

a plurality of vane members divided from each other, the plurality of vane members together conforming to a shape of the first outlet, and coupled to a plurality of hinge shafts provided on the inner cover, respectively, to be rotatable; and a link member connecting the plurality of vane members to each other so that the plurality of vane members simultaneously pivot about the plurality of hinge shafts.

\* \* \* \* \*